United States Patent Office 3,422,130
Patented Jan. 14, 1969

3,422,130
(PERFLUOROARYL)FERROCENES AND THE
SYNTHESIS THEREOF
Harold Rosenberg, Dayton, Ohio, assignor to the United
States of America as represented by the Secretary of
the Air Force
No Drawing. Filed Aug. 31, 1966, Ser. No. 576,783
U.S. Cl. 260—439                              9 Claims
Int. Cl. C08f 35/00

ABSTRACT OF THE DISCLOSURE

New (perfluoroaryl)ferrocene monomers and polymers may be prepared by reacting ferrocenyllithium compounds with hexafluorobenzene in a tetrahydrofuran-alkane solution. The compounds thus prepared are useful as coatings and films because of their resistance to oxidation and radiation degradation.

---

The invention described herein may be manufactured and used by or for the United States Government for governmental purposes without payment to me of any royalty thereon.

This invention relates to fluorine-containing ferrocene compounds and particularly to (perfluoroaryl)ferrocenes including such as are monomers and polymers.

Since the discovery of bis(cyclopentadienyl)iron (or ferrocene) in 1951, many derivatives of this unique organometallic substance have been prepared and their properties studied. In an effort to make the unique radiation and oxidation resistance of the ferrocene available in a broad range of applications, particularly at high temperatures or upon exposure to high dimensional stress, more recent attention has focused upon chemically incorporating the ferrocene moiety into polymeric structures wherein, its chemical integration notwithstanding, it will continue to impart its unique properties to the polymers which may themselves take the form of various films, coatings, laminating components and the like.

At the same time, much attention has been focused upon the incorporation of fluorine in a wide variety of compounds, particularly high-temperature elastomers, lubricating fluids and greases. It is not surprising therefore that attempts have been made to combine fluorine and ferrocene in a single polymeric structure; but, until the teachings of the present invention, it has been impossible to do so in any stable compound or to achieve any reasonably practical and economical yield. As a matter of fact the art has heretofore failed to produce any workable or usable fluorine-containing ferrocene compound of any type. For example, the treatment of ferrocene with benzenediazonium halides has been found to be a suitable method for the preparation of arylferrocenes, but the instability of pentafluorophenyldiazonium salts has heretofore precluded the use of this method for the synthesis of perfluoroarylferrocenes.

It is accordingly an object of this invention to provide as new compositions of matter a family of fluorine-containing ferrocene compounds.

A more specific object of the present invention is to provide (perfluoroaryl)ferrocene compounds.

Another specific object of the present invention is to provide perfluoroarylferrocene compounds which are monomeric and polymeric in nature.

Still another object of the present invention is to provide methods for synthesizing and polymerizing (perfluoroaryl)ferrocenes.

To achieve these and other objects and advantages which will appear from a reading of the following disclosure, the present invention teaches the reaction of a monolithioferrocene or a dilithioferrocene with hexafluorobenzene in tetrahydrofuran. The ferrocenyllithium component is obtained according to known reactions such as that of chloromercuriferrocene and n-butyllithium or ethyllithium. The reaction takes place in the presence of tetrahydrofuran in an alkane or mixed alkane solvent solution, such as with hexane, pentane, heptane or petroleum ether.

Where the monolithioferrocene is reacted with an equimolar amount of hexafluorobenzene in the tetrahydrofuran-alkane solution, the reaction product is (pentafluorophenyl)ferrocene. Where the same monolithioferrocene is reacted with the same hexafluorobenzene in the same tetrahydrofuran-alkane solution but the molar ratio of the ferrocenyllithium to the hexafluorobenzene is two to one, 1,4-diferrocenyl-2,3,5,6-tetrafluorobenzene is the product. Although these fluorine-containing derivatives are not monomers and do not lead to the formation of polymers, they do combine the properties of ferrocene and organofluorine compounds and are useful as additives, particularly as antioxidants and radiation absorbers or inhibitors of radiation degradation in coatings, fluids and other polymeric materials. Moreover, the 1,4-diferrocenyl-tetrafluorobenzene has proven useful as a model compound for further study, analysis and development of fluorine-containing ferrocenes and particularly of those with polymerizable repetitive units.

The present invention also teaches the reaction of 1,1'-dilithioferrocene with hexafluorobenzene in the tetrahydrofuran-alkane mixture. Where the molar ratio of the dilithioferrocene to the hexafluorobenzene is one to two, the resultant fluorine-containing ferrocene is 1,1'-bis(pentafluorophenyl)ferrocene which is a useful monomer and may lead to polymer formation. On the other hand, direct polymer formation results upon the reaction of the dilithioferrocene and hexafluorobenzene when they are reacted in the tetrahydrofuran-alkane solution in equimolar ratios and the reaction mixture worked up in the same manner as for the monomeric (perfluoroaryl)ferrocene derivatives. The resultant polymer is poly(1,1'-tetrafluorophenyleneferrocenylene) according to the structure

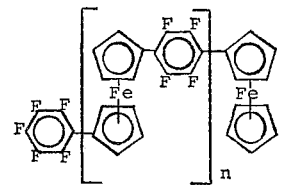

wherein $n$ is an integer from one to twenty. This particular polymer is soluble in benzene and other organic solvents and has a melting point below 200 degrees centigrade.

To obtain the same polymer but of a higher molecular weight and longer chain length, the 1,1'-bis(pentafluorophenyl)ferrocene obtained as set forth above may be further reacted with an equimolar amount of dilithioferrocene in the tetrahydrofuran-alkane solution and the reaction mixture worked up in the same manner as for the monomeric (perfluoroaryl)ferrocene derivatives to yield both a soluble, low molecular-weight polymer and a high molecular-weight product. The $n$ or the number of repetitive or mer units appearing in the high molecular-weight polymer resulting from this manipulation of the 1,1'-bis(pentafluorophenyl)ferrocene as a monomer is greater than twenty and the product is insoluble in organic solvents and has a melting point above 300 degrees centigrade.

The polymers resulting from this work have high thermal stability and high radiation resistance or protection capabilities as a result of which they are useful in coatings and as components in various composite materials for use where high temperature and high radiation exposure are expected to be encountered. The monomer and the polymers are also useful as additives in lubricants and other fluids to improve the oxidation and wear resistance thereof.

In the preparation of (pentafluorophenyl)ferrocene, a monolithioferrocene prepared by the reaction of chloromercuriferrocene and ethyllithium is added with stirring under nitrogen to an equimolar quantity of hexafluorobenzene in tetrahydrofuran-hexane at a rate to maintain the temperature of the mixture at 30 degrees centigrade. Gilman's Color Test I is negative at the end of this addition. The solvents and the diethylmercury are removed by evaporation in vacuo. To the solid residue remaining is added ether and ten percent hydrochloric acid and the mixture is thereupon filtered to remove a small quantity of dark solid. The ether layer is then separated, washed with a saturated sodium chloride solution, dried over anhydrous magnesium sulfate and filtered. The residue remaining after removal of the ether is extracted with petroleum ether (B.P. 30–60 degrees) and the extract is chromatographed using Woelm Neutral Alumina (activity grade I.) Elution with petroleum ether gives first a small quantity of ferrocene and then crude pentafluorophenylferrocene in a thirty-one percent yield. Recrystallization from 95 percent ethanol gives the pure (pentafluorophenyl)ferrocene as evidenced by its characteristic melting point of from 97 to 98.2 degrees centigrade and by elemental, infrared and nuclear magnetic resonance spectroscopic analysis.

In the preparation of 1,4-diferrocenyltetrafluorobenzene, a one molar quantity of hexafluorobenzene in tetrahydrofuran is added slowly with stirring under nitrogen to a double molar proportion of tetrahydrofuran-hexane solution of ferrocenyllithium, prepared by the reaction of ferrocenylmercuric chloride with n-butyllithium. The temperature of the mixture rises slightly during the addition but is not allowed to go above 24 degrees centigrade. The solvents are removed by evaporation in vacuo and the residue consisting of di-n-butylmercury and an unidentified solid is treated with methylene chloride and ten percent hydrochloric acid. After filtration of this mixture, the layers of the filtrate are separated. The methylene chloride layer is washed with water, dried over anhydrous magnesium sulfate, filtered and the methylene chloride is removed by evaporation in vacuo. The remaining material is extracted several times with petroleum ether at −40 degrees centigrade to remove the di-n-butylmercury. Heating of the solid residue in vacuo to 30 degrees centigrade results in sublimation of the product from the mixture as an orange solid with a melting point of 177–180 degrees centigrade which is identifiable by infrared spectroscopy, nuclear magnetic resonance spectroscopy, and elemental analysis as 1,4-diferrocenyltetrafluorobenzene or, more specifically, as 1,4-diferrocenyl-2,3,5,6-tetrafluorobenzene.

Where a one molar amount of 1,1'-dilithioferrocene, prepared by the reaction of 1,1'-bis(chloromercuri)ferrocene with n-butyllithium in tetrahydrofuran-hexane, is added slowly with stirring under nitrogen to a water-cooled solution of at least a double molar quantity of hexafluorobenzene in tetrahydrofuran, 1,1'-bis(pentafluorophenyl)ferrocene is obtained. The temperature of the mixture in this process is maintained at from 23 to 25 degrees centigrade during the addition of the reactants and the mixture is stirred for nine hours after the addition is completed. To the residue remaining after removal of the solvents is added methylene chloride and ten percent hydrochloric acid. After filtration of this mixture, the separated methylene chloride is washed with water, dried over anhydrous magnesium sulfate and filtered. The methylene chloride is removed by evaporation in vacuo, and the residue is extracted several times with petroleum ether at −40 degrees to remove the di-n-butylmercury. The material remaining after extraction is heated in vacuo. A white fluorine-containing organomercury compound sublimes from the mixture leaving the crude (perfluoroaryl)ferrocene in 76 percent yield. Recrystallization from a mixture of methylene chloride and methanol yields a material having a melting point of from 170–173 degrees centigrade which is shown by infrared spectroscopy, nuclear magnetic resonance spectroscopy and elemental analysis to be 1,1'-bis(pentafluorophenyl)ferrocene.

While the 1,1'-bis(pentafluorophenyl)ferrocene is not self-polymerizing, it may, as previously shown, be treated as a monomer by being reacted with a one to one molar amount of 1,1'-dilithioferrocene in a tetrahydrofuran-hexane solution to produce the polymer, poly(1,1'-tetrafluorophenyleneferrocenylene), of high molecular weight and indeterminate chain length with a melting point above 300 degrees centigrade, together with a lower melting, lower molecular-weight fraction wherein the number of mer or repetitive units is approximately from one to twenty and the melting point is approximately 200 degrees centigrade, the lower molecular-weight fraction being soluble in benzene and other organic solvents while the higher molecular-weight fraction is insoluble. The lower molecular-weight soluble fraction may be obtained as a polymer directly by the reaction between the dilithioferrocene and hexafluorobenzene in the tetrahydrofuran-hexane solution where the dilithioferrocene and hexafluorobenzene are reacted in equimolar amounts.

While the present invention has been described in considerable detail in connection with specific examples and embodiments, the foregoing particularization has been for the purpose of illustration only and does not limit the scope of the invention as defined in the subjoined claims.

I claim:

1. As a new composition of matter, a fluorine-containing ferrocene compound of the class which consists of (pentafluorophenyl)ferrocene, 1,4 - diferrocenyl - 2,3,5,6-tetrafluorobenzene, 1,1' - bis(pentafluorophenyl)ferrocene and poly(1,1'-tetrafluorophenyleneferroencylene).

2. As a new composition of matter a fluorine-containing ferrocene polymer having the structural formula

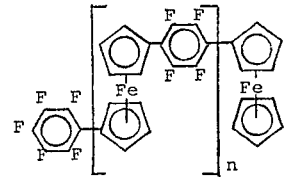

wherein *n* is an integer.

3. A new composition of matter according to claim 2 wherein *n* is an integer of from one to twenty and the composition is characterized by a melting point below 200 degrees centigrade.

4. A new composition of matter according to claim 2 wherein *n* is an integer of more than twenty and the composition is characterized by a melting point above 300 degrees centigrade.

5. A method for the synthesis of (pentafluorophenyl)-ferrocene comprising reacting monolithioferrocene and hexafluorobenzene in an equimolar ratio in a tetrahydrofuran-alkane solution.

6. A method for the synthesis of 1,4-diferrocenyl-2,3,5,6-tetrafluorobenzene comprising reacting monolithioferrocene and hexafluorobenzene in a two to one molar ratio in a tetrahydrofuran-alkane solution.

7. A method for the synthesis of 1,1'-bis(pentafluorophenyl)ferrocene comprising reaction 1,1'-dilithioferrocene with hexafluorobenzene in a one to two molar relationship in a tetrahydrofuran-alkane solution.

8. A method for the synthesis of poly(1,1'-tetrafluorophenyleneferrocenylene) comprising reacting equimolar amounts of 1,1'-dilithioferrocene and hexafluorobenzene in a tetrahydrofuran-alkane solution.

9. A method for the synthesis of poly(1,1'-tetrafluorophenyleneferrocenylene) comprising reacting equimolar amounts of 1,1'-dilithioferrocene and 1,1'-bis(pentafluorophenyl)ferrocene in a tetrahydrofuran-alkane solution.

References Cited

Chem. and Eng. News, Feb. 10, 1964, pp. 40–41.

TOBIAS E. LEVOW, *Primary Examiner.*

A. P. DEMERS, *Assistant Examiner.*

U.S. Cl. X.R.

252—49.7, 384, 400; 260—2, 45.75